United States Patent
Cho et al.

(10) Patent No.: US 9,202,624 B2
(45) Date of Patent: Dec. 1, 2015

(54) CONDUCTIVE PASTE COMPOSITION FOR EXTERNAL ELECTRODE AND MULTILAYER CERAMIC ELECTRONIC COMPONENT FABRICATED USING THE SAME

(71) Applicant: SAMSUNG ELECTRO-MECHANICS CO., LTD., Suwon, Gyunggi-do (KR)

(72) Inventors: Jae Choon Cho, Suwon-si (KR); Hee Sun Chun, Suwon-si (KR); Choon Keun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 189 days.

(21) Appl. No.: 13/912,852

(22) Filed: Jun. 7, 2013

(65) Prior Publication Data

US 2013/0329336 A1    Dec. 12, 2013

(30) Foreign Application Priority Data

Jun. 11, 2012   (KR) .................. 10-2012-0062253

(51) Int. Cl.
*H01G 4/228* (2006.01)
*H01G 4/008* (2006.01)
*H01G 4/30* (2006.01)
*H01G 4/232* (2006.01)
*H01G 4/12* (2006.01)

(52) U.S. Cl.
CPC ............. *H01G 4/008* (2013.01); *H01G 4/2325* (2013.01); *H01G 4/30* (2013.01); *H01G 4/12* (2013.01)

(58) Field of Classification Search
USPC ................ 361/306.3, 303–305, 301.2, 301.4, 361/321.1, 321.2, 306.1, 321.5, 311–313
See application file for complete search history.

(56) References Cited

U.S. PATENT DOCUMENTS 5,204,025 A  *  4/1993   Yamada et al. ............... 252/500
2012/0147521 A1 * 6/2012   Kim et al. .................. 361/321.2

FOREIGN PATENT DOCUMENTS

JP   06-267784       9/1994
KR   10-2005-0102767 10/2005

\* cited by examiner

*Primary Examiner* — Nguyen T Ha
(74) *Attorney, Agent, or Firm* — NSIP Law

(57) ABSTRACT

There are provided a conductive paste composition for an external electrode and a multilayer ceramic electronic component fabricated using the same, the conductive paste composition for an external electrode including: a conductive metal powder; and a resin mixture including at least one resin selected from a group consisting of an epoxy-based resin and a phenoxy-based resin, and a polyvinyl formal resin.

12 Claims, 2 Drawing Sheets

CONDUCTIVE PASTE COMPOSITION FOR EXTERNAL ELECTRODE AND MULTILAYER CERAMIC ELECTRONIC COMPONENT FABRICATED USING THE SAME

CROSS-REFERENCE TO RELATED APPLICATIONS

This application claims the priority of Korean Patent Application No. 10-2012-0062253 filed on Jun. 11, 2012, in the Korean Intellectual Property Office, the disclosure of which is incorporated herein by reference.

BACKGROUND OF THE INVENTION

1. Field of the Invention

The present invention relates to a conductive paste composition for an external electrode, capable of having a low flexural modulus so as to be applied to product groups having specifications which require high degrees of reliability, such as electronic apparatuses, high-pressure products, and the like, to thereby absorb impacts, and a multilayer ceramic electronic component fabricated using the same.

2. Description of the Related Art

Among the ceramic electronic components, multilayer ceramic capacitors include a plurality of laminated dielectric layers, internal electrodes disposed to face each other, having the dielectric layers interposed therebetween, and external electrodes electrically connected to the internal electrodes.

Multilayer ceramic capacitors have been widely used as components in mobile communications devices, such as computers, personal digital assistants (PDAs), mobile phones, and the like, due to advantages thereof, such as a small size, high capacity, ease of mounting, and the like.

Recently, as demand for small and multi-functional electronic products has increased, chip parts tend to be miniaturized and multi-functional. As a result, demand for small and high-capacity multilayer ceramic capacitors has increased.

To this end, multilayer ceramic capacitors in which a large number of dielectric layers are laminated by reducing thicknesses of the dielectric layers and the internal electrode layers have been fabricated, and thicknesses of external electrodes have also been reduced.

As functions of products requiring high degrees of reliability, such as cars, medical devices, and the like, have been digitalized and demand for digitalized functions in many products has increased, ultra small and ultra high-capacity multilayer ceramic capacitors are required to high degrees of reliability so as to meet the demand for product reliability.

One factor that may cause degradation in reliability may be the occurrence of cracks and the like due to external impacts.

Therefore, to solve the defect detailed above, a paste capable of absorbing impacts is provided between an external electrode layer and a plating layer to absorb an external impact, thereby improving product reliability.

However, there is demand for multilayer ceramic electronic components having higher degrees of reliability so as to be applied to product groups having specifications which require high degrees of reliability, such as electronic apparatuses, high-pressure parts, and the like and therefore, external electrodes are also required to have higher levels of reliability.

SUMMARY OF THE INVENTION

An aspect of the present invention provides a conductive paste composition applied between an external electrode and a plating layer of a multilayer ceramic capacitor to be able to impart a high degree of reliability to the multilayer ceramic capacitor, and a multilayer ceramic capacitor having a high degree of reliability.

According to an aspect of the present invention, there is provided a conductive paste composition for an external electrode, including: a conductive metal powder; and a resin mixture including at least one resin selected from a group consisting of an epoxy-based resin and a phenoxy-based resin, and a polyvinyl formal resin.

The resin mixture may be included in an amount of 6 to 18 parts by weight based on 100 parts by weight of the conductive metal powder.

The polyvinyl formal resin may be included in an amount of 5 wt % to 20 wt % in the resin mixture.

The epoxy-based resin may be included in an amount of 24.0 wt % to 28.5 wt % in the resin mixture.

The phenoxy-based resin may be included in an amount of 56.0 wt % to 66.5 wt % in the resin mixture.

The conductive metal powder may be formed of at least one selected from a group consisting of silver (Ag), copper (Cu), nickel (Ni), and sliver-palladium (Ag—Pd).

According to another aspect of the present invention, there is provided a multilayer ceramic electronic component, including: a ceramic body including a dielectric layer; first and second internal electrodes disposed to face each other within the ceramic body, having the dielectric layer interposed therebetween; a first external electrode electrically connected to the first internal electrode and a second external electrode electrically connected to the second internal electrode; and conductive resin layers formed on the first external electrode and the second external electrode, wherein the conductive resin layers include a conductive metal powder; and a resin mixture including at least one resin selected from a group consisting of an epoxy-based resin and a phenoxy-based resin, and a polyvinyl formal resin.

The resin mixture may be included in an amount of 6 to 18 parts by weight based on 100 parts by weight of the conductive metal powder.

The polyvinyl formal resin may be included in an amount of 5 wt % to 20 wt % in the resin mixture.

The epoxy-based resin may be included in an amount of 24.0 wt % to 28.5 wt % in the resin mixture.

The phenoxy-based resin may be included in an amount of 56.0 wt % to 66.5 wt % in the resin mixture.

The conductive metal powder may be formed of at least one selected from a group consisting of silver (Ag), copper (Cu), nickel (Ni), and sliver-palladium (Ag—Pd).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
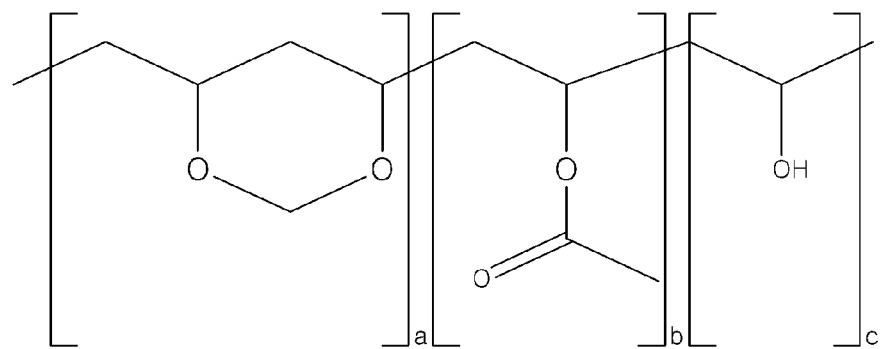
FIG. 1 is a diagram illustrating a structural formula of a polyvinyl formal resin included in a paste composition for an external electrode according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

FIG. 1 is a diagram illustrating a structural formula of a polyvinyl formal resin according to an embodiment of the present invention.

An embodiment of the present invention provides a conductive paste composition for an external electrode including: a conductive metal powder; and a resin mixture including at least one resin selected from a group consisting of an epoxy-based resin and a phenoxy-based resin, and a polyvinyl formal resin.

The conductive metal powder may be formed of any metal without limitation, as long as the metal may be electrically connected to first and second external electrodes. For example, the metal may include at least one selected from a group consisting of silver (Ag), copper (Cu), nickel (Ni), and sliver-palladium (Ag—Pd).

The resin composition may be included in an amount of 6 to 18 parts by weight based on 100 parts by weight of the conductive metal powder.

When the resin mixture is included in an amount of less than 6 parts by weight based on 100 parts by weight of the conductive metal powder, a flexural modulus may be increased and bonding strength may be reduced, while when the resin mixture is included in an amount of more than 18 parts by weight, specific resistance is increased, such that the conductive paste composition including the resin mixture may not be used as a paste for an external electrode.

According to the embodiment of the present invention, the polyvinyl formal resin may be included in an amount of 5 wt % to 20 wt % in the resin mixture.

When the polyvinyl formal resin is included in an amount of less than 5 wt % in the overall resin mixture, the flexural modulus may be reduced, but is insufficiently reduced, while when the polyvinyl formal resin is included in an amount of more than 20 wt %, a continuous reduction in a flexural modulus may be obtained, but bonding strength may be reduced to disadvantageously cause an interlayer delamination phenomenon.

According to the embodiment of the present invention, a molecular weight of the polyvinyl formal resin is not particularly limited, but may be within a range between 40,000 and 54,000.

According to the embodiment of the present invention, the contents of the epoxy-based resin and the phenoxy-based resin are not particularly limited. However, the epoxy-based resin may be included in an amount of 24.0 wt % to 28.5 wt % in the resin mixture and the phenoxy-based resin may be included in an amount of 56.0 wt % to 66.5 wt % in the resin mixture.

Figure 2:
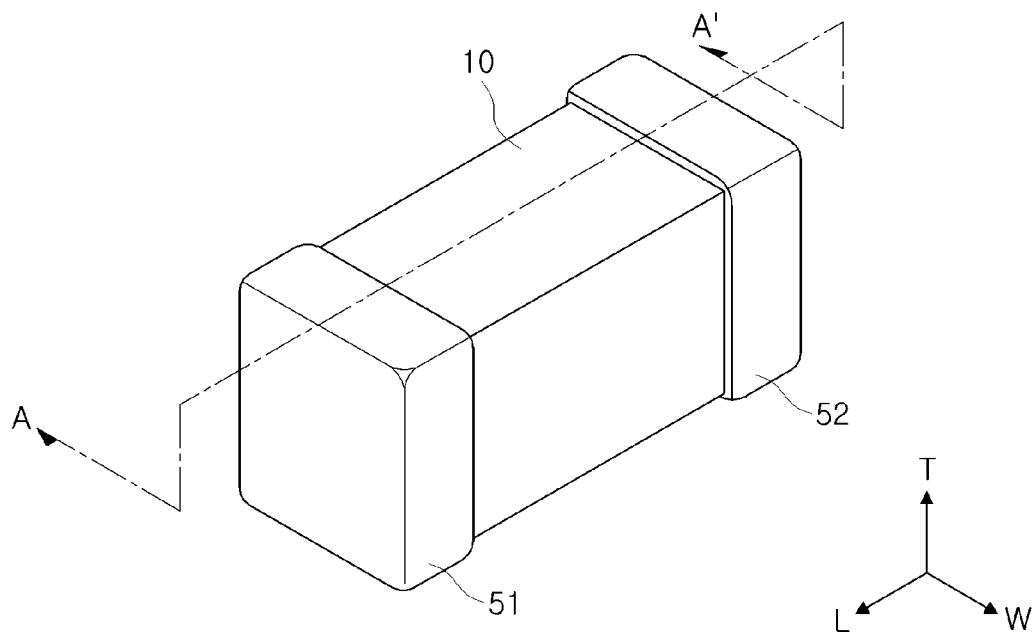
FIG. 2 is a perspective view schematically illustrating a multilayer ceramic capacitor according to an embodiment of the present invention.

FIG. 2 is a perspective view schematically illustrating a multilayer ceramic capacitor according to an embodiment of the present invention.

Figure 3:
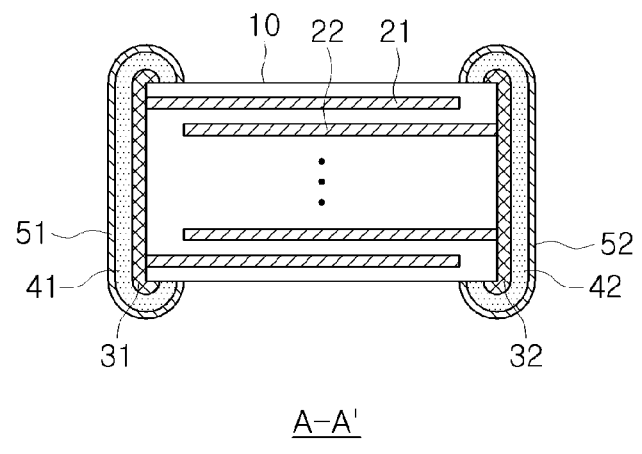
FIG. 3 is a cross-sectional view taken along line A-A' of FIG. 2.

FIG. 3 is a cross-sectional view taken along line A-A' of FIG. 2

Referring to FIGS. 2 and 3, an embodiment of the present invention provides a multilayer ceramic capacitor including: a ceramic body 10 including a dielectric layer; first and second internal electrodes 21 and 22 disposed to face each other within the ceramic body, having the dielectric layer interposed therebetween; and a first external electrode 31 electrically connected to the first internal electrode 21 and a second external electrode 32 electrically connected to the second internal electrode 22; and conductive resin layers 41 and 42 formed on the first external electrode and the second external electrode, respectively, wherein the conductive resin layers 41 and 42 may include a conductive metal powder; and a resin mixture including at least one resin selected from a group consisting of an epoxy-based resin and a phenoxy-based resin, and a polyvinyl formal resin.

Hereinafter, the multilayer ceramic electronic component according to the embodiment of the present invention will be described. In particular, the multilayer ceramic capacitor will be described as an example of the multilayer ceramic electronic component, but the present invention is not limited thereto.

According to the embodiment of the present invention, a raw material forming the dielectric layer is not particularly limited as long as sufficient capacitance may be obtained therefrom, but may be, for example, a barium titanate (BaTiO$_3$) powder.

As a material forming the dielectric layer, various ceramic additives, organic solvents, plasticizers, binders, dispersing agents, and the like, may be applied to a powder, such as a barium titanate (BaTiO$_3$) powder or the like, depending on an intended purpose of the present invention.

A material forming the first and second internal electrodes 21 and 22 is not particularly limited, but the first and second internal electrodes 21 and 22 may be formed using a conductive paste formed of at least one of, for example, silver (Ag), lead (Pg), platinum (Pt), nickel (Ni), and copper (Cu).

The multilayer ceramic capacitor according to the embodiment of the present invention may include the first external electrode 31 electrically connected to the first internal electrode 21 and the second internal electrodes 32 electrically connected to the second internal electrode 22.

The first and second external electrodes 31 and 32 having opposing polarities may be electrically connected to the first and second internal electrodes 21 and 22, respectively, to form capacitance.

The multilayer ceramic capacitor according to an embodiment of the present invention may include the conductive resin layers 41 and 42, containing the conductive metal powder and the resin mixture including at least one resin selected from a group consisting of an epoxy-based resin and a phenoxy-based resin, and a polyvinyl formal resin, on the first and second external electrodes 31 and 32.

Features of the conductive resin layers for the external electrodes are overlapped with the descriptions of the conductive paste composition according to the foregoing embodiment of the present invention, and therefore the description thereof will be omitted herein.

According to an embodiment of the present invention, the conductive resin layers including the polyvinyl formal resin is formed on the first and second external electrodes 31 and 32, such that the external electrodes capable of absorbing an external impact may be formed and the occurrence of cracks may be reduced, thereby implementing a multilayer ceramic electronic component having excellent reliability.

The following Table 1 shows measurement results of flexural modulus, depending on the contents of resin included in the conductive paste composition for an external electrode. The conductive metal powder was included in an amount of 70 wt % in the overall paste composition, and as the conductive metal powder, silver (Ag) powder was used.

In detail, as the silver (Ag) powder, spherical power particles having a diameter of 1.5 μm and flake type powder particles having a major axis length of 8.5 μm were used at a ratio of 1:1.

As solvents, butyl cabitol acetate (BCA) and propylene glycol monomethyl ether (PGM ME) were used.

In the Comparative Example and the Inventive Example, the contents of resin were different, but other conditions were identical in the both Examples. The measurements were performed under a temperature of 25° C.

TABLE 1

| | Comparative Example | Inventive Example 1 | Inventive Example 2 | Inventive Example 3 | Inventive Example 4 |
|---|---|---|---|---|---|
| Phenoxy resin | 70.0 wt % | 66.5 wt % | 63.0 wt % | 59.5 wt % | 56.0 wt % |
| Epoxy resin | 30.0 wt % | 28.5 wt % | 27.0 wt % | 25.5 wt % | 24.0 wt % |
| Polyvinyl formal resin | — | 5 wt % | 10 wt % | 15 wt % | 20 wt % |
| Flexural modulus | 6.37 Gpa | 5.28 Gpa | 4.63 Gpa | 3.95 Gpa | 3.08 Gpa |

Referring to Table 1, when the polyvinyl formal resin was added to the conductive paste composition, the flexural modulus was reduced by 1 Gpa or more, as compared to the case of the Comparative Example (an epoxy resin and a phenoxy resin were only added in the Comparative Example). When the polyvinyl formal resin in an amount of 2 wt % was added, the flexural modulus was reduced by 3 Gpa or more. In consideration of bonding strength, it could be appreciated that it was advantageous to add the polyvinyl formal resin to the overall resin mixture, in an amount of 5 wt % to 20 wt %.

As set forth above, according to the embodiment of the present invention, a conductive resin layer having a low flexural modulus can be fabricated by adding a predetermined amount of a polyvinyl formal resin to a conductive paste composition at the time of fabricating the conductive paste composition for an external electrode.

Further, multilayer ceramic electronic components having a high degree of reliability can be implemented at the time of applying the conductive paste composition according to the embodiment of the present invention to the external electrode.

While the present invention has been shown and described in connection with the embodiments, it will be apparent to those in the art that modifications and variations can be made without departing from the spirit and scope of the invention as defined by the appended claims. Accordingly, various substitution, modifications and alteration may be made within the scope of the present invention may be made by those skilled in the art without departing from the spirit of the prevent invention defined by the accompanying claims.

What is claimed is:

1. A conductive paste composition for an external electrode, comprising:
    a conductive metal powder; and
    a resin mixture including a polyvinyl formal resin and at least one resin selected from a group consisting of an epoxy-based resin and a phenoxy-based resin.

2. The conductive paste composition for an external electrode of claim 1, wherein the resin mixture is included in an amount of 6 to 18 parts by weight based on 100 parts by weight of the conductive metal powder.

3. The conductive paste composition for an external electrode of claim 1, wherein the polyvinyl formal resin is included in an amount of 5 wt % to 20 wt % in the resin mixture.

4. The conductive paste composition for an external electrode of claim 1, wherein the epoxy-based resin is included in an amount of 24.0 wt % to 28.5 wt % in the resin mixture.

5. The conductive paste composition for an external electrode of claim 1, wherein the phenoxy-based resin is included in an amount of 56.0 wt % to 66.5 wt % in the resin mixture.

6. The conductive paste composition for an external electrode of claim 1, wherein the conductive metal powder is formed of at least one selected from a group consisting of silver (Ag), copper (Cu), nickel (Ni), and sliver-palladium (Ag—Pd).

7. A multilayer ceramic electronic component, comprising:
    a ceramic body including a dielectric layer;
    first and second internal electrodes disposed to face each other within the ceramic body, having the dielectric layer interposed therebetween;
    a first external electrode electrically connected to the first internal electrode and a second external electrode electrically connected to the second internal electrode; and
    conductive resin layers formed on the first external electrode and the second external electrode,
    wherein the conductive resin layers include a conductive metal powder; and a resin mixture including a polyvinyl formal resin and at least one resin selected from a group consisting of an epoxy-based resin and a phenoxy-based resin.

8. The multilayer ceramic electronic component of claim 7, wherein the resin mixture is included in an amount of 6 to 18 parts by weight based on 100 parts by weight of the conductive metal powder.

9. The multilayer ceramic electronic component of claim 7, wherein the polyvinyl formal resin is included in an amount of 5 wt % to 20 wt % in the resin mixture.

10. The multilayer ceramic electronic component of claim 7, wherein the epoxy-based resin is included in an amount of 24.0 wt % to 28.5 wt % in the resin mixture.

11. The multilayer ceramic electronic component of claim 7, wherein the phenoxy-based resin is included in an amount of 56.0 wt % to 66.5 wt % in the resin mixture.

12. The multilayer ceramic electronic component of claim 7, wherein the conductive metal powder is formed of at least one selected from a group consisting of silver (Ag), copper (Cu), nickel (Ni), and sliver-palladium (Ag—Pd).

* * * * *